United States Patent Office 3,016,289
Patented Jan. 9, 1962

3,016,289
PROCESS FOR PRODUCING PURIFIED SILICON HALOGENIDE
Franz Arthur Pohl and Toni Hauskrecht, Belecke (Moehne), Germany, assignors to Licentia Patent-Verwaltungs G.m.b.H., Hamburg, Germany
No Drawing. Filed Apr. 24, 1958, Ser. No. 730,523
Claims priority, application Germany Apr. 25, 1957
4 Claims. (Cl. 23—205)

This invention relates to a process for producing a purified silicon halide, and more particularly to the production of boron trichloride-free silicon tetrachloride.

The use of elementary silicon in semi-conductor arrangements such as rectifiers, photoelectric cells, transistors and other electrically, magnetically or light-controlled unsymmetrically conductive systems requires that the silicon be produced in a well defined crystallized state, preferably as monocrystals, and of an extreme degree of purity.

For this purpose, it is conventional in the art to obtain silicon of the desired purity by thermically decomposing silicon halides in the presence of gaseous hydrogen and thus produce the elementary silicon in the form of crystal needles or as a powder. The conversion of silicon halides to silicon can be carried out, for instance, as described by F. B. Litton and H. C. Anderson in "J. Electrochem. Soc." 101 (1954), pages 287–292, or by H. C. Theuerer in "Bell. Lab. Rec." 33 (1955), pages 327–330.

After the silicon obtained by these decomposition processes has been brought into the desired polycrystalline or monocrystalline form, it still contains considerable amounts of impurities which do not permit its use for semiconductor purposes. Therefore, the silicon material is formed as rods and then subjected to repeated fusion and recrystallization in a zone which is caused to travel the length of the rod. This so-called "zone-refining" process is described by W. G. Pfann in "J. of Metals" (July 1952), pages 747–754, and by W. G. Pfann and K. M. Olsen in "Bell. Lab. Rec." 33 (1955), pages 201–205.

However, all these measures are not sufficient to produce a crystalline silicon that fully satisfies the extreme degree of purity that is desired in the art of semiconductors.

In particular, it is not possible to remove boron from the silicon except to a very unsatisfactory degree. Since boron as an element of the third group of the Periodic Table of Mendeleev is electrically active in silicon, it is not possible to determine the electrical properties of the silicon containing boron impurity centers in uncontrollable amounts and random distribution uniformly and with sufficient accuracy.

Moreover, very small amounts of boron in the order of $10^{-7}$ down to $10^{-8}$ percent per gram-atom of silicon cause noticeable electrical disturbances.

For this reason, a purification of silicon halides for the removal of boron by fractionated distillation based on the differences between the boiling points of silicon tetrachloride and boron trichloride is not sufficiently effective, the aforesaid difference amounting to only 45° centigrade; consequently even when a large portion of the boron halides has been eliminated in this manner, there are still boron impurities retained in greater amounts than are permissible in the use of the silicon as semiconductor material.

It is, therefore, an object of our invention to provide a process for producing silicon tetrachloride which is exceptionally free from boron trichloride impurities and therefore well suited as a starting material for the production of boron-free elementary, crystalline silicon for use in the semiconductor field.

This object is obtained by the process according to our invention which comprises the steps of (a) Preparing a mixture of silicon tetrachloride and an organic compound containing per molecule at least one atom carrying a "lone" electron pair, of one of the two elements occupying the two lowest atomic numbers in Group V of the Periodic Table of Mendeleev, i.e. of either nitrogen or phosphorus, as a purifying agent, and (b) Separating the silicon tetrachloride free from boron from the excess of the purifying agent and from addition compounds formed by the latter with boron trichloride.

"Lone electron pairs" are discussed, for instance, in Karrer, "Organic Chemistry," Fourth English Edition (1950), pages 65 and 66.

By the preparation of the aforesaid mixture of the lone-electron-pair carrier substance, acting as a purifying agent, with $BCl_3$-containing silicon tetrachloride, the boron trichloride enters into thermically and chemically stable addition compounds with the carrier substance, which additive compounds have a much lower vapor pressure than silicon tetrachloride while the purifying agent does not form compounds with silicon tetrachloride itself.

Furthermore, the above described purifying agent should have a boiling point substantially different from the boiling point of silicon tetrachloride, which is 57.6° C. under normal atmospheric pressure.

Consequently, separating the silicon tetrachloride free from boron from the excess of the purifying agent as well as from the aforesaid boron addition compounds, can be easily achieved by fractionated distillation.

The silicon tetrachloride purified according to the above described process contains no boron impurity that can be detected either with the well known methods of trace analysis or with the new greatly refined method described hereinafter. The content of boron trichloride in the purified silicon tetrachloride is, therefore, at least below $10^{-7}$ and preferably below $10^{-9}$ percent by weight.

While it has already been proposed in Patent 2,812,235 that substantial amounts of boron trichloride can be largely removed from silicon tetrachloride with the aid of triphenylchloromethane and triphenylfluormethane, we have discovered that a vastly superior purification effect can be achieved with a much more readily available and more economical group of substances which comprise:

I. Nitrogen-containing organic compounds in the molecules of which the nitrogen is trivalent and therefore possesses a lone electron pair: Cyanogen halides such as cyanogen chloride CNCl, amides such as cyanamide $CN.NH_2$, nitriles such as propionitrile $C_2H_5CN$, tertiary amino hydrocarbons such as dimethylaniline $$C_6H_5.N:(CH_3)_2$$

azo compounds such as azo benzene $C_6H_5N:NC_6H_5$ and lactams such as caprolactam

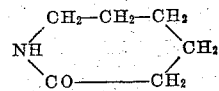

II. Phosphorus containing organic compounds in the molecules of which the phosphorus atom is trivalent and therefore possesses a lone electron pair: Alkyl and aryl derivatives of phosphorus trichloride such as, in particular, triethylphosphine $(C_2H_5)_3P$, monophenylphosphine $C_6H_5PH_2$, and the like.

Comparative tests have shown that when 100 milliliters (ml.) of silicon tetrachloride containing 10 milligrams (mg.) of boron in the form of boron trichloride (i.e., about 113.5 mg. of the latter) are admixed with the tenfold molar amount of triphenylchloromethane and distilled, the first fraction separated from the mixture contain more than 10 micrograms (μg.) of boron trichloride per ml. of distilled fraction. We believe that this is due to a lack of stability of the addition compounds formed by the boron trichloride and triphenylchloro- or fluoromethane. We believe that this is due to the fact that these addition compounds are not formed with a substance containing a nitrogen or phosphorus atom having a single, unshared electron pair.

In contact thereto, a test carried out with the same amount of silicon tetrachloride and boron trichloride but with the addition of a tenfold molar amount of a purifying agent according to the present invention revealed that the first fractions of the distilled mixture contained less than 0.1 μg. of boron per ml. of distillate. Purifying agents containing a central atom having a "lone" electron pair therefore showed a performance which is at least hundred times better than the purification obtained with the substances described in Patent 2,812,235.

The aforesaid compounds are characterized by the fact that the nitrogen or phosphorus atoms in their molecules possess a single, lone electron pair forming part of the external electron shell of eight electrons surrounding the nitrogen or phosphorus atom in the above described classes of organic compounds. While the three other electron pairs constituting the octet of the aforesaid external shell each pertain to the nitrogen or phosphorus atom in common with one of the other atoms constituting the molecule in question and are, therefore, "shared" electron pairs, the fourth electron pair is the above-named "lone" or unshared pair and pertains exclusively to the nitrogen or phosphorus atom itself. The theory of shared and lone, or unshared, electron pairs is further discussed in W. Hueckel, "Anorganische Strukturchemie" (1948), pages 66–90, published by F. Enke, Stuttgart, Germany, and by Fieser and Fieser, "Organic Chemistry" (1950), pages 8, 9, 18, and 19.

The single unshared electron pair of the nitrogen or phosphorus atom present in the molecules of the groups comprising the above-listed compounds is capable to form an addition compound with the boron atom in the boron trichloride molecule, whereby this electron pair is shared by the boron atom and the nitrogen or phosphorus atom in an unpolar or covalent bond. Thereby, the number of electrons in the outer electron shell of the boron atom is increased from six in the trichloride molecule to eight in the addition compound. As a result of this change in the electron shell of the boron atom, the planar character of the $BCl_3$ molecule is changed to a tetrahedronal configuration in the addition molecule, in which the boron atom occupies the center, while the three chlorine atoms and the nitrogen or phosphorus atom of one of the above-listed purifying agents occupy the four corners of the tetrahedron. The nitrogen or phosphorus atom contributing its lone electron pair to this addition molecule is also termed the donor while the boron atom would be termed the "acceptor" and the bond between the purifying agent molecule on the one hand, and the boron trichloride molecule on the other hand, may also be termed an "acceptor-donor bond."

We have further discovered that the purifying effect of the purifying agent, i.e. the donor molecule is the greater, the better the steric configuration of the donor molecule fits into the above-described tetrahedronal addition molecule. This factor contributes to a higher thermal as well as chemical stability of the addition compound with $BCl_3$, and correspondingly to a lower vapor pressure and improved separability from the silicon tetrachloride to be purified of $BCl_3$. This is particularly achieved when on the one hand the donor atom is of smaller atomic volume, as in the case of nitrogen as the donor atom, and on the other hand, the molecule containing the donor atom is not too large and therefore permits formation of a well balance tetrahedronal system.

The known triphenyl methans derivatives mentioned hereinbefore are also less suited for attaining the above stated goal, because their halogen atoms are very loosely bonded to the remaining part of the molecule (see Karrer, supra, page 401) and the steric configuration of the triphenyl methyl chloride or fluoride molecule is such that it does not readily fit into the tetrahedron formed with the three chlorine atoms of $BCl_3$ but upsets the formation of a well balanced tetrahedron.

The formation of the tetrahedronal system consisting of the additive bonds of the purifying agent molecule to $BCl_3$ is favored by having the addition reaction take place at a temperature range between $-70°$ C. and $+50°$ C., and preferably between $0°$ C. and $+20°$ C.

The mixture is then separated by distilling off silicon tetrachloride. The excess of the purifying agent having a boiling point much higher than the boiling point of silicon tetrachloride remains in the residue. The boron trichloride addition compound having a much lower vapor pressure than silicon tetrachloride at the boiling point of silicon tetrachloride is also remaining in the residue.

In the case of very low solubility of the boron trichloride addition compound with the purifying agent in the silicon tetrachloride the latter can be sucked off through a quartz frit into a quartz distillation apparatus and can then be separated from the excess of the purifying agent by fractionated distillation. The silicon tetrachloride, however, can be separated from the mixture with the excess of the most purifying agent adapted for use in the method according to the invention and the boron trichloride addition compound by the simple way of distillating off.

According to a further mode of operation of the method according to the invention, the silicon tetrachloride obtained by the above-described steps can be further processed to obtain a boron-free elementary silicon of the highest purity. To this end, the resultant silicon tetrachloride is decomposed in a closed reaction vessel under sufficiently strong heating, for instance, by indirect high frequency induction heating in an inert atmosphere, with or without high vacuum, and eventually in the presence of a reduction agent such as hydrogen. The elementary silicon being set free in this manner, is formed in the liquid state by deposition on a movable receptor body, the speed of movement of which receptor is so controlled, that the silicon is deposited in the formed liquid silicon and forms a solid, for instance, rod-shaped body as it is moved out of the heated zone in the apparatus.

The formed silicon rod can then be further treated by the above mentioned zone-refining, described also by W. G. Pfann and K. M. Olsen in "Bell Lab. Rec." 33 (1955), pages 201–205.

Contact of the liquid silicon deposit with extraneous matter such as the walls of the reactor and the like, can be avoided by using as the receptor body a solid, crystalline silicon ingot.

Some further details of this method of depositing silicon from the vapor phase are described, for instance, in the French Patent 1,125,277.

Purification may also be continued to remove impurities other than boron by repeated fusion and recrystallization by zone-refining as described by P. H. Keck in "Physica" 20 (1954), No. 11, pages 1059–1065. It becomes thus possible to obtain a silicon of substantially improved degree of purity.

Thus far, no chemical analyses for traces are known to have a sufficient degree of sensitivity to determine $10^{-8}$ to $10^{-10}$ parts by weight of boron per part of silicon, since the reagents required in the known analytical methods such as sodium hydroxide contain boron impurities in higher concentrations than those mentioned above.

Electrical conductivity measurements employed for determining the amounts of boron present in silicon are equally unsatisfactory, since these methods can only determine total amounts of impurity centers present in silicon, and an actual amount of boron present may be disguised by the presence of other impurities of opposite conductivity.

The determination of the boron content in the silicon tetrachloride purified according to the method of our present invention, has been carried out with a new method described in "Actas do XV Congresso International de Química Pura e Aplicada (Química Analítica) I, 30, Lisboa." The new method does not employ inorganic salts as reagents and thus avoids the contamination of the analytical reaction products with boron introduced with these salts. According to this new method of boron determination in silicon, silicon crystals which have not been comminuted, are treated in an analytical apparatus made of quartz, with hot bromine vapors. The silicon bromide thus obtained is hydrolyzed together with the boron bromide contained therein and then separated by percolation with methanol and isopropyl ether. The extracted boric acid is determined photometrically with curcumin. In this manner, $10^{-9}$ parts by weight of boron per part of silicon can be determined with an exactness of $\pm 10\%$.

Silicon crystals obtained from silicon tetrachloride purified according to the method of the present invention through the method described, for instance in the following Example XI have been found, by the new analytical method mentioned above, to contain less than $10^{-9}$ parts of boron per part (by weight) of silicon. These extremely boron-free silicon crystals show an electrical resistivity of 500 to 2000 ohm-centimeter and a minority carrier lift time from 200 to 1000 microseconds.

The following examples in which the parts are by weight unless otherwise stated are illustrative of specific embodiments of the invention. It is to be understood that these examples are not intended as limitative.

*Example I*

1000 milliliters (ml.) of $SiCl_4$ produced in a conventional manner as described by L. Gattermann in "Berichte" 27 (1894), pages 1943 and the following, are poured into a quartz container having an opening that can be closed by a thread-connected lid. 0.5 ml. of propionitrile ($C_2H_5.CN$; B.P. 97.1° C.) are added thereto, the container is closed and shaken in an automatic shaker for one hour at a temperature of $+20°$ C. The boron trichloride contained as impurity in $SiCl_4$ is additively bonded to a part of the propionitrile.

After the shaking step is terminated, the container is connected to a fractionating column, the contents of the container are heated gradually, first to 55.6° C. at which temperature about 10 ml. of an azeotropic mixture of $SiCl_4$ and $C_2H_5CN$ are distilled off. Toward the end of this fraction the distillation temperature rises to 57.6° C., thus indicating that pure $SiCl_4$ is being evaporated. Boron impurity is remaining in the residue as the addition compound. 970 ml. of purified $SiCl_4$ are obtained.

An analysis for traces of boron is carried out with a test sample by means of the new extremely sensitive method of boron determination in silicon compounds. No traces of boron are found, which shows that less than $10^{-9}$ parts by weight of boron, if any, remains in the purified silicon tetrachloride.

*Example II*

1000 parts by weight of silicon tetrachloride from the same source as in Example I are filled into a quartz container similar to that used in Example I together with 1 part by weight of azobenzene $C_6H_5.N:N.C_6H_5$, as the purifying agent, and then shaken for about 3 hours at a temperature of $+20°$ C.

After the shaking step is terminated, the silicon tetrachloride is sucked with the aid of a vacuum pump causing a weak depression through a quartz frit into a quartz distillation apparatus. By this way the excess of azobenzene with the boron addition compound are separated from silicon tetrachloride. After this step the silicon tetrachloride is distilled off. About 980 ml. of purified silicon tetrachloride are obtained.

*Example III*

1000 parts by weight of silicon tetrachloride from the source as in Example I are filled into a quartz container similar to that used in Example I together with 1 part by weight triethylphosphine (($C_2H_5)_3P$; B.P. 128° C.) as the purifying agent, and then shaken for about one hour at a temperature of $+20°$ C.

After the shaking step is terminated, the container is connected to a fractionating column and the purified $SiCl_4$ is distillated off at a temperature of 57.6° C. The boron addition compound is remaining in the residue.

No traces of boron are found by test with the new extremely sensitive method of boron determination in silicon compounds, which shows that less than $10^{-9}$ parts by weight of boron, if any, remains in the purified $SiCl_4$.

*Example IV*

Example III is repeated, using one part of ethyldiphenylphosphine $C_2H_5.P(C_6H_5)_2$; B.P. 293° C. as the purifying agent for every 1000 parts by weight of silicon tetrachloride.

*Example V*

Example III is repeated, using one part of cyanogen chloride CNCl; B.P. 13.8° C. as the purifying agent for every 1000 parts by weight of silicon tetrachloride. Due to its low boiling point, the excess of purifying agent is distilled off first, while the purified silicon tetrachloride is obtained in the second fraction. The addition compound of cyanogen chloride with boron trichloride remains in the residue.

*Example VI*

Example III is repeated, using one part of cyanamide $CN.NH_2$; B.P. 140° C. as the purifying agent for every 1000 parts by weight of silicon tetrachloride.

*Example VII*

Example III is repeated, using one part of dimethylaniline $C_6H_5.N(CH_3)_2$; B.P. 194° C. as the purifying agent for every 1000 parts by weight of silicon tetrachloride.

*Example VIII*

Example III is repeated, using one part of caprolactam $$\begin{array}{c} CH_2\!-\!CH_2\!-\!CH_2 \\ NH \qquad\qquad CH_2 \\ CO\!-\!-\!-\!-\!CH_2 \end{array}$$

as the purifying agent for every 1000 parts by weight of silicon tetrachloride.

*Example IX*

Example III is repeated by using monophenylphosphine $C_6H_5PH_2$ instead of the purifying agent used in the Example III. Monophenylphosphine has a boiling point of 160° C. at atmospheric pressure and yields results when used in the method according to our invention which are similar to those obtained with Example III.

*Example X*

Example I is repeated with 1000 ml. of silicon tetrachloride to which 1 ml. of propionitrile has been added. The results are the same as in Example I.

*Example XI*

This example illustrates the further processing of silicon tetrachloride purified from boron impurities by the method of the invention illustrated in the preceding examples. The purified silicon tetrachloride which is evaporated from the purification mixture, as described in any one of these examples, is then admixed to a stream of pure hydrogen and the mixture introduced into a quartz vessel. The rate of flow of the hydrogen may be about 100 liters per hour. The ratio of admixture of silicon tetrachloride to hydrogen is preferably so adjusted that about 30 to 60 ml., for instance 40 ml., of silicon tetrachloride are evaporated per 100 liters of hydrogen. By this adjustment of the rate of flow of the gases at the inlet and outlet of the reaction chamber in the quartz vessel, it is possible to maintain either a slightly excess pressure or a slightly reduced pressure in that chamber. The excess of non-reacted hydrogen, the non-reacted portion of silicon tetrachloride, and the gaseous reaction products between the two gas components resulting from the reduction and decomposition of silicon tetrachloride, leave the chamber through the afore-said outlet.

A rod-shaped silicon body having a diameter between 10 and 25 mm. for instance 15 mm., is arranged in the quartz vessel displaceably in the direction of the rod axis. At one end of the rod, which is preferably positioned vertically in the quartz vessel, heating by means of a high frequency emitter of about 2 to 5 kilowatts is effected to melt the tip of the rod by inductive heating. This can be achieved with a frequency higher than 100 kilocycles, for instance of about 1 megacycle. The rod tip should consist of highly purified silicon. In the gas-filled space surrounding the liquified silicon rod tip, a thermic decomposition and reduction of silicon tetrachloride with the entraining hydrogen takes place. The elementary silicon thus formed from the silicon tetrachloride is incorporated in the liquid silicon tip.

Now, the silicon rod is removed out of the reaction space in axial direction at a velocity of about 0.1 to about 2 centimeters (cm.) per hour, for instance in the present example at a velocity of 0.5 cm. per hour. The velocity of withdrawal is adjusted to the rate of silicon deposition on the liquid tip of the silicon rod, so that the volume of the liquid zone at the end of the rod remains substantially constant. Sealing means are provided where the cooled down silicon rod is withdrawn from the reaction chamber to the outside of the quartz vessel and can be cut off from the continuously growing silicon rod. In this manner it is possible to grow the silicon rod via its liquid tip, by about 2 grams (g.) of highly pure silicon per hour.

*Example XII*

The highly pure silicon obtained according to the preceding example can then be further purified by zone-refining in the following manner. This zone-refining treatment is carried out in an evacuated quartz tube which is surrounded at one zone by a high frequency heating device. A rod-shaped silicon body is disposed coaxially with the axis of the quartz tube in the interior of the latter and is supported displaceably at its two ends. With the aid of the aforesaid high frequency device, a transverse zone of the silicon rod is molten, however while maintaining the coherence of the rod surface. The silicon rod is now moved in axial direction so that the molten zone moves from one end of the rod toward the other. This process may be repeated several times. By this treatment, a redistribution of impurities other than boron that may eventually still be present in the silicon, takes place at the border zone between the molten zone and the solidifying portion of the rod; i.e., that part of the rod that is leaving the melting zone. Those impurities which have a distribution coefficient smaller than 1 are thereby accumulated in the liquid zone and are moved due to the translation of the molten zone through the rod toward the one end of the silicon rod.

For instance, a rod-shaped silicon body having a diameter of 10 to 30 mm., and in the present instance 15 mm., as obtained by the preceding example, can be subjected to the above-described zone refining. The high frequency inductive heating device may operate with an output of 2 to 10 kilowatts and at frequencies higher than 100 kilocycles. The width of the molten zone may be of 10 to 20 mm., for instance 15 mm., while its diameter is, of course, equal to that of the rod.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference of conditions without necessarily departing from the spirit of this disclosure and the scope of the appended claims.

What we claim is:

1. A process for producing silicon tetrachloride substantially free from boron trichloride comprising the steps of adding to silicon tetrachloride containing boron trichloride, an excess of azobenzene, reacting said boron trichloride present in the silicon tetrachloride with a portion of said azobenzene to form an addition compound, and separating a silicon tetrachloride substantially free from boron trichloride from the mixture containing silicon tetrachloride, said addition compound and said excess of purifying agent, the aforesaid steps being conducted at a temperature below the decomposition temperatures of both the purifying agent and the addition compound.

2. A process for producing silicon tetrachloride substantially free from boron trichloride comprising the steps of adding to silicon tetrachloride containing boron trichloride, an excess of azobenzene, reacting said boron trichloride present in the silicon tetrachloride with a portion of said azobenzene to form an addition compound, and separating by distillation a silicon tetrachloride substantially free from boron trichloride from the mixture containing silicon tetrachloride, said addition compound and said excess of purifying agent, the aforesaid steps being conducted at a temperature below the decomposition temperatures of both the purifying agent and the addition compound.

3. The process as described in claim 1, wherein the reaction of the purifying agent with the boron trichloride contained in the silicon tetrachloride to be purified is caused to take place between $-70°$ C. and $+50°$ C.

4. The process as described in claim 2, wherein the separation of the purified silicon tetrachloride from the aforesaid mixture is effected by sucking the silicon tetrachloride with the aid of a vacuum pump causing a weak depression through a quartz frit into a quartz recipient which is connected to a quartz distillation apparatus, and distilling the silicon tetrachloride from the mixture with the excess of purifying agent.

References Cited in the file of this patent

UNITED STATES PATENTS

| 2,768,074 | Stauffer | Oct. 23, 1956 |
| 2,812,235 | Winslow | Nov. 5, 1957 |
| 2,857,249 | Wolff | Oct. 21, 1958 |

FOREIGN PATENTS

| 656,098 | Great Britain | Aug. 15, 1951 |
| 745,698 | Great Britain | Feb. 29, 1956 |